US009714770B2

(12) United States Patent
Rasmussen et al.

(10) Patent No.: US 9,714,770 B2
(45) Date of Patent: Jul. 25, 2017

(54) FRESH AIR COOLING DEVICE

(71) Applicants: Michael Steven Rasmussen, Ramsey, MN (US); Jeffrey Alan Thibedeau, Robbinsdale, MN (US)

(72) Inventors: Michael Steven Rasmussen, Ramsey, MN (US); Jeffrey Alan Thibedeau, Robbinsdale, MN (US)

(73) Assignee: Hoffman Enclosures, Inc., Anoka, MN (US)

( * ) Notice: Subject to any disclaimer, the term of this patent is extended or adjusted under 35 U.S.C. 154(b) by 650 days.

(21) Appl. No.: 14/231,929

(22) Filed: Apr. 1, 2014

(65) Prior Publication Data

US 2015/0276249 A1    Oct. 1, 2015

(51) Int. Cl.
| F24F 7/06 | (2006.01) |
| F24F 7/007 | (2006.01) |
| F24F 11/00 | (2006.01) |
| F24F 11/04 | (2006.01) |
| F24F 1/00 | (2011.01) |
| F24F 3/16 | (2006.01) |

(52) U.S. Cl.
CPC ........ *F24F 11/0001* (2013.01); *F24F 1/0007* (2013.01); *F24F 3/1603* (2013.01); *F24F 11/0012* (2013.01); *F24F 11/0076* (2013.01); *F24F 11/04* (2013.01); *F24F 2001/004* (2013.01); *F24F 2011/0002* (2013.01); *F24F 2011/0006* (2013.01); *F24F 2011/0019* (2013.01); *Y02B 30/78* (2013.01)

(58) Field of Classification Search
CPC ............... F24F 11/0001; F24F 11/0012; F24F 11/0076; F24F 11/04; F24F 1/0007; F24F 3/1603

USPC .......................................................... 454/251
See application file for complete search history.

(56) References Cited

U.S. PATENT DOCUMENTS

| 4,373,576 A | | 2/1983 | Strupczewski | |
| 4,437,608 A | | 3/1984 | Smith | |
| 4,470,342 A | * | 9/1984 | Hall, Jr. ................. | F24F 11/053 137/894 |
| 4,987,952 A | * | 1/1991 | Beal ...................... | F24F 3/1405 165/225 |
| 5,058,388 A | * | 10/1991 | Shaw ..................... | F24F 3/044 62/176.6 |
| 5,236,393 A | * | 8/1993 | Milewski ............... | F24F 7/065 454/266 |

(Continued)

OTHER PUBLICATIONS

International Search Report and Written Opinion of the International Searching Authority issued issued in PCT application No. PCT/US15/23867; mailed Jul. 2, 2015; 11 pages.

*Primary Examiner* — Steven B McAllister
*Assistant Examiner* — Jonathan Cotov
(74) *Attorney, Agent, or Firm* — Quarles & Brady LLP

(57) ABSTRACT

Embodiments of the invention provide an air conditioning unit and a ventilator. The ventilator has an impeller to draw outside air into an enclosure and cause air within the enclosure to be exhausted to the outside. The ventilator can be tied into the air conditioning unit's control system and act to supplement the cooling and ventilation needs of the space. Alternatively, the ventilator can have a separate integral control system. By having a separate control system, the ventilator can operate as a stand-alone device.

16 Claims, 6 Drawing Sheets

(56) References Cited

U.S. PATENT DOCUMENTS

| | | | | |
|---|---|---|---|---|
| 5,447,037 A | * | 9/1995 | Bishop | F24F 3/044 |
| | | | | 165/251 |
| 5,485,878 A | * | 1/1996 | Derks | F24F 13/20 |
| | | | | 165/137 |
| 2006/0021375 A1 | * | 2/2006 | Wetzel | F24F 1/025 |
| | | | | 62/419 |
| 2007/0111655 A1 | * | 5/2007 | Song | F24F 11/0017 |
| | | | | 454/292 |
| 2007/0190925 A1 | * | 8/2007 | Tollar | F24F 7/025 |
| | | | | 454/242 |
| 2007/0205297 A1 | * | 9/2007 | Finkam | F24F 11/001 |
| | | | | 236/1 C |
| 2010/0083682 A1 | * | 4/2010 | Koehler | H05K 7/202 |
| | | | | 62/262 |
| 2010/0126208 A1 | * | 5/2010 | Stammer | F24F 1/022 |
| | | | | 62/419 |
| 2011/0111688 A1 | * | 5/2011 | Tollar | F24F 7/02 |
| | | | | 454/238 |
| 2011/0159795 A1 | * | 6/2011 | Sprague | H05K 7/20181 |
| | | | | 454/184 |

* cited by examiner

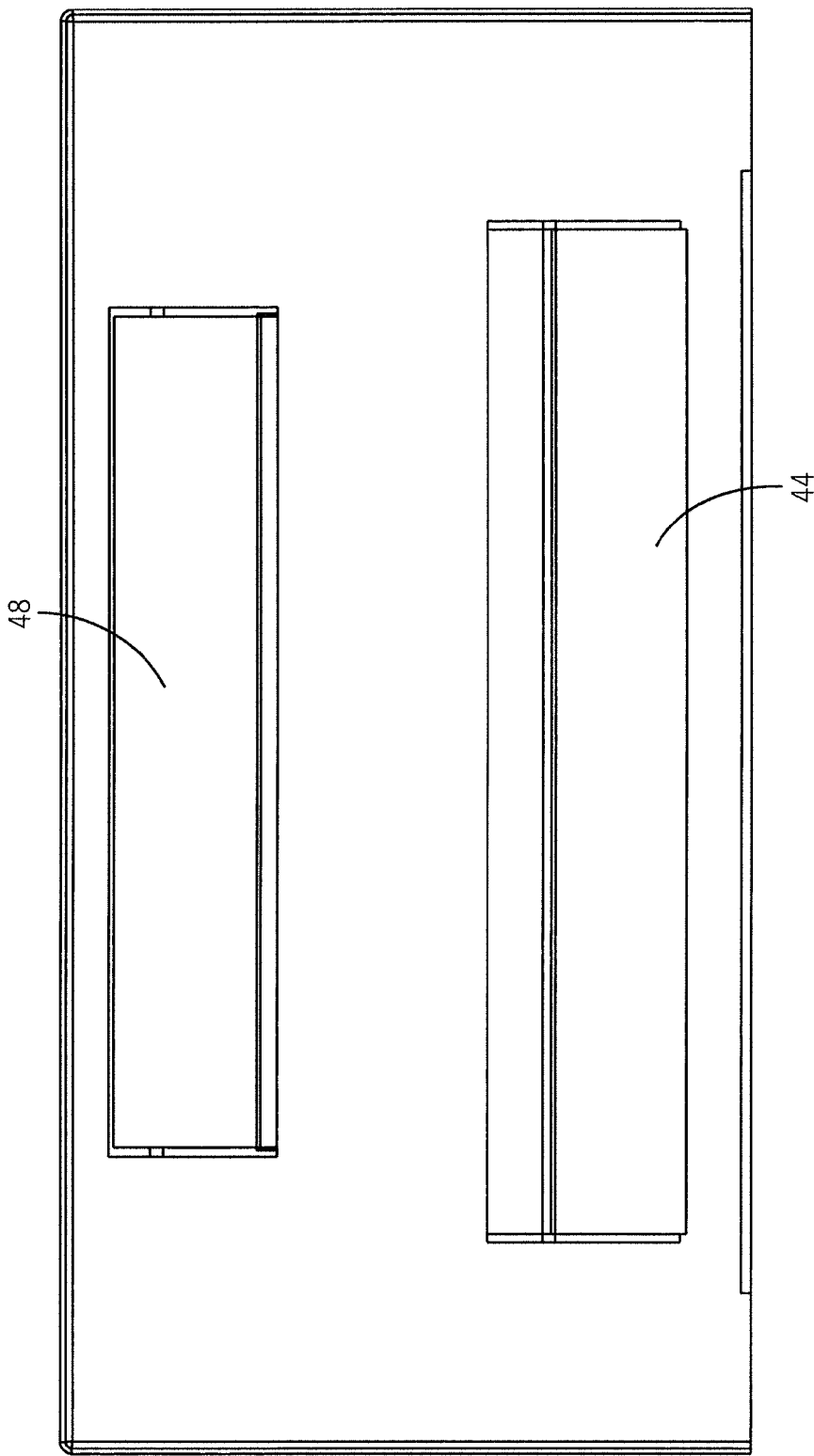

FRESH AIR COOLING DEVICE

BACKGROUND

Air conditioning (AC) systems for enclosures can include an economizer assembly to allow circulation of fresh, outdoor air into the enclosures. When the air outside of a conditioned space is cool and dry, a device or economizer can be used to bring outside air directly into the interior space to provide supplemental cooling. Because the outside air is both sufficiently cool and sufficiently dry, the amount of enthalpy in the air is already acceptable and no additional conditioning of the air is required. Thus, this provides for "free cooling" as no additional energy costs are required to condition the air brought into the interior space. This free cooling provided by the cool outside air can be used to supplement the main air conditioner cooling. Using an economizer for free cooling will extend the life of the air conditioner and reduce energy consumption by reducing the time that the air conditioner needs to operate.

While current AC systems for larger-sized electrical enclosures use economizers, they require fairly large additional attachments or custom housings to incorporate these economizer assemblies. The increased size of the housing or complicated construction of the additions can greatly increase costs of these AC systems. Smaller AC systems often do not include an economizer assembly to prevent increased costs of requiring such a large and/or complex footprint to air condition a smaller space. Further, AC systems which used economizers typically used the economizers as complementary devices to the main air conditioning device.

Therefore there exists a need for an economizer or ventilator which can be used with both larger and smaller AC systems and that can operate as a complementary device to the main AC system or as an independent, stand-alone device.

SUMMARY OF THE INVENTION

One embodiment of the invention provides a ventilator which can be located near an air conditioning (AC) unit. The ventilator can be connected to the AC unit to operate as a complementary device to the AC unit. When the ventilator is acting as a complementary device, the AC unit can be equipped with controls to interface with the ventilator. The ventilator can also have an impeller to move and circulate the air as well as multiple sensors for measuring outside air quality conditions such as temperature and humidity. The controller in the air conditioner will control the impeller as well as direct the air conditioner to suspend cooling and conditioning the air when the ventilator is operating and bringing in fresh, cool outside air.

In an alternative embodiment, the invention provides a ventilator which will have its own separate controller. Having a dedicated controller allows the ventilator to operate independently from the AC unit. Thus, in this embodiment, the ventilator can be used as a stand-alone cooling device.

These and other features, aspects, and advantages of the present invention will become better understood upon consideration of the following detailed description, drawings, and appended claims.

DESCRIPTION OF THE DRAWINGS

FIG. 6 is a rear view of the ventilator of FIG. 5

DETAILED DESCRIPTION

Figure 1:
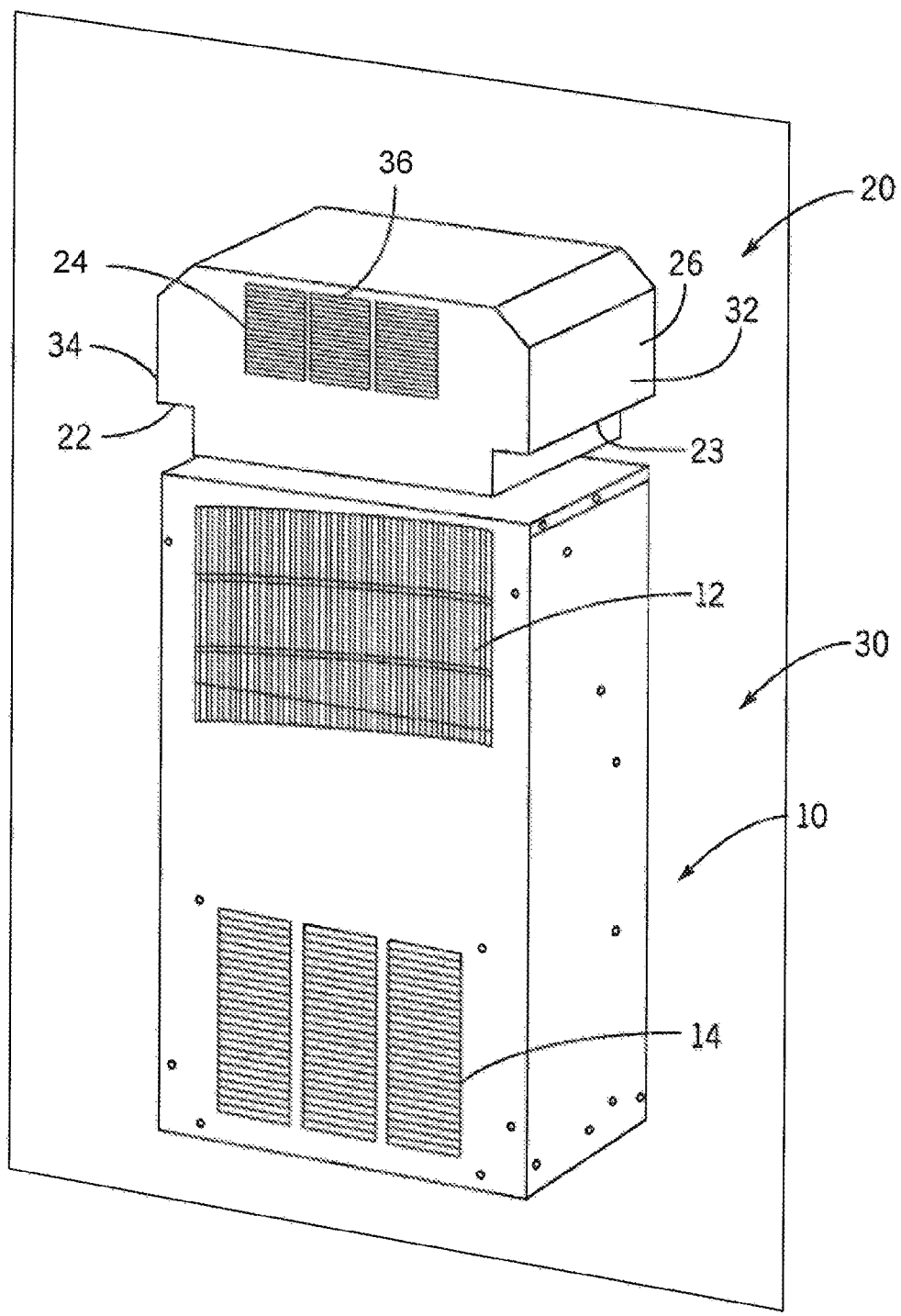
FIG. 1 is a perspective view of a first embodiment of a ventilator and air conditioning unit.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

FIG. 1 illustrates an AC unit 10 and ventilator 20 according to one embodiment of the invention. The AC unit 10 and ventilator 20 can each be a side-mounted unit to a small building or enclosure. In some embodiments, the AC unit 10 can be used for conditioning air in spaces, such as buildings, houses, or enclosures. The AC unit 10 can include an exhaust vent 12 and an intake vent 14. The exhaust vent 12 can permit the release of exhaust air from the AC unit 10 to the outside surroundings (i.e., the ambient environment). The intake vent 14 can permit the intake of recirculated air within the conditioned space.

The ventilator 20 can also include intake vents 22, 23 a supply vent 25 (shown in FIGS. 3 and 4), a return vent 27 (shown in FIGS. 3 and 4), and an exhaust vent 24. As shown in FIG. 1, the intake vents 22, 23 can each include vent hoods 26, 28 and grilles 32, 34 respectively. The vent hoods 26, 28 can direct airflow and prevent rain or debris from contacting the grilles 32, 34. Similarly, the exhaust vent 24 can also include a grille 36. In some embodiments, the grilles 32, 34, 36 can be punch patterns made in the panels covering the air intake 22 and exhaust 24 vent openings. The apertures of the grilles 26 and 28 can be sized so they do not impede the exchange of air, but still protect the vents 22 and 23 from small animals or debris. The direction of air flow through the vents 22 and 23 is illustrated by arrows in FIG. 2.

Referring back to FIG. 1, a ventilator 20 is shown mounted above the AC unit 10 and both are mounted against an enclosure 30. In this embodiment where the ventilator 20 is mounted and connected to the AC unit 10, the ventilator 20 can be controlled by the AC unit 10. The ventilator 20 can have an impeller to move air within the conditioned space. The AC unit's 10 control system can control the ventilator's 20 impeller as appropriate to meet the desired temperature or ventilation needs of the space.

In some embodiments, the AC unit controller can attempt to control the ventilator 20 based on a sensed dry bulb temperature or air enthalpy, in addition to temperature. For example, outside air enthalpy can be measured to determine if running the ventilator 30 is sufficient for ventilating the enclosure. This can be accomplished using an outside air enthalpy sensor and/or an inside air enthalpy sensor, as well as an outside air temperature sensor, an inside air temperature sensor, an outside humidity sensor, and/or an inside humidity sensor.

The outside air enthalpy and temperature sensors can be placed outside the AC unit 10 and ventilator 20 to retrieve an accurate representation of the outside air enthalpy and temperature. For example, the outside sensors can be placed a substantial distance from the exhaust vents 12, 24, because sensing the enthalpy of air from the exhaust vent would not give an accurate representation of the outside air. Inside air enthalpy and temperature sensors can be placed either inside the enclosure 30 near the return vent or within the AC unit 10 directly in line with return air in order to retrieve an accurate representation of inside air enthalpy and temperature. The control system can determine the outside and/or inside air enthalpies, as well as compare the outside and inside air temperatures to determine whether outdoor air can be used to cool the enclosure 30 rather than requiring the use of mechanical cooling.

If running the ventilator 20 in an economizer cooling mode has not sufficiently cooled the enclosure 30 at a desired rate, the control system can switch to a mechanical cooling mode or some other mixture of economizer cooling and mechanical cooling can be implemented.

In an alternative embodiment, the ventilator 20 can also be equipped with its own integral set of controls. In the event that the AC unit 10 fails, the ventilator's 20 control system could operate the ventilator 20 to serve as an emergency backup. Because the ventilator 20 has its own integral control system, it does not require input from a functioning AC unit 10 and therefore would be suitable to serve as an emergency cooling solution should the AC unit 10 ever fail. Further, because the ventilator 20 has its own separate control system, it can operate as a stand alone device.

Figure 2:
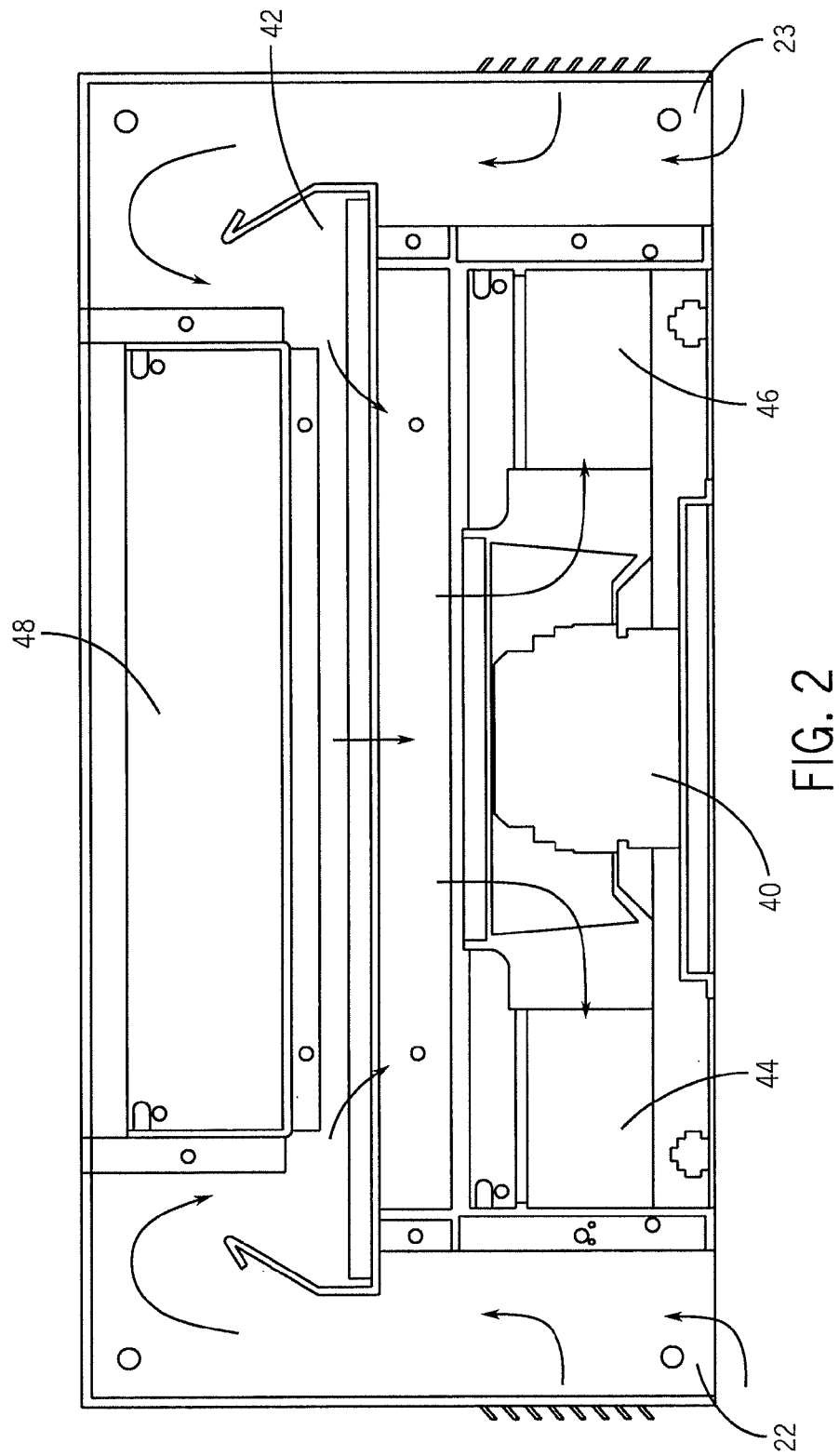
FIG. 2 is a front sectional view of the ventilator of FIG. 1 showing an air flow diagram.

As shown in FIG. 2, the ventilator 20 can include a motorized impeller 40, an air filter 42, inlet dampers 44, 46, and an outlet damper 48. The motorized impeller 40 can draw outside air through the air intakes 22, 23 and air filter 42. The air intakes 22, 23 are located at the bottom of the ventilator 20. The air is brought into the ventilator 20 and is forced to the top of the ventilator 20 before making a quick turn and being forced through an air filter 42. The impeller 40 then pushes the outside air towards the inlet dampers 44, 46 which lead to the enclosure 30. The outside air is purposefully taken through this torturous path in order to slow the air flow and allow water droplets to fall out of the air stream. The filter is provided to catch contaminants that may fall out of the air stream.

Figure 3:
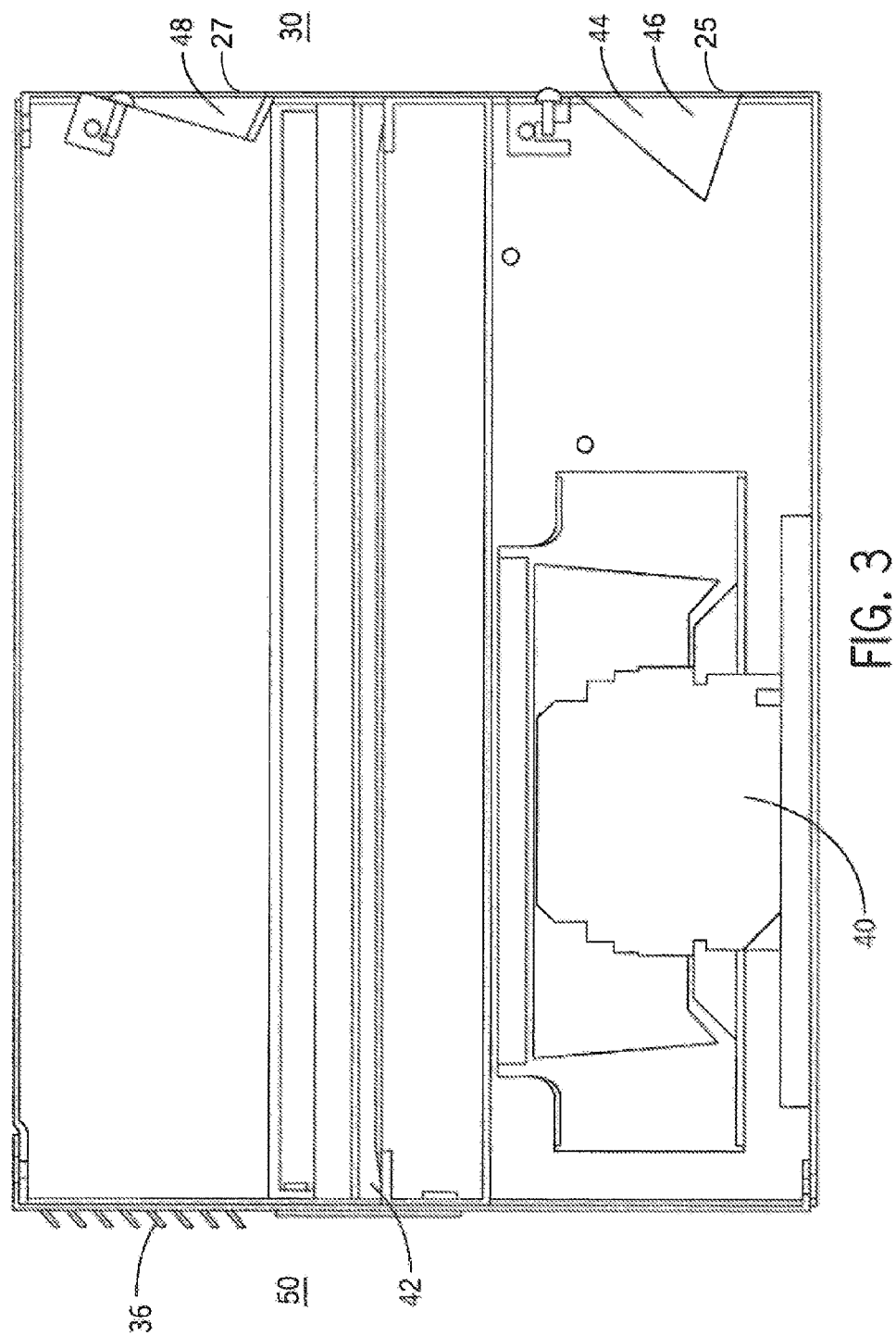
FIG. 3 is a side sectional view of the ventilator of FIG. 1 in an inactive state.

As the impeller 40 operates, it pressurizes the interior space of the ventilator 20. Once the space within the ventilator 20 is sufficiently pressurized, the outside air will push through the inlet dampers 44, 46 and enter the enclosure 30. FIG. 3 illustrates a cross-sectional side view of the ventilator 20 in an inactive state. In an inactive state, the inlet dampers 44, 46 and outlet dampers 48 are shown as defaulting to a normally closed state to prevent air from entering or leaving the enclosure 30. However, in an alternative embodiment, it is envisioned that the inlet 44, 46 and outlet 48 dampers can also default to a normally open state or a partially open state.

Figure 4:
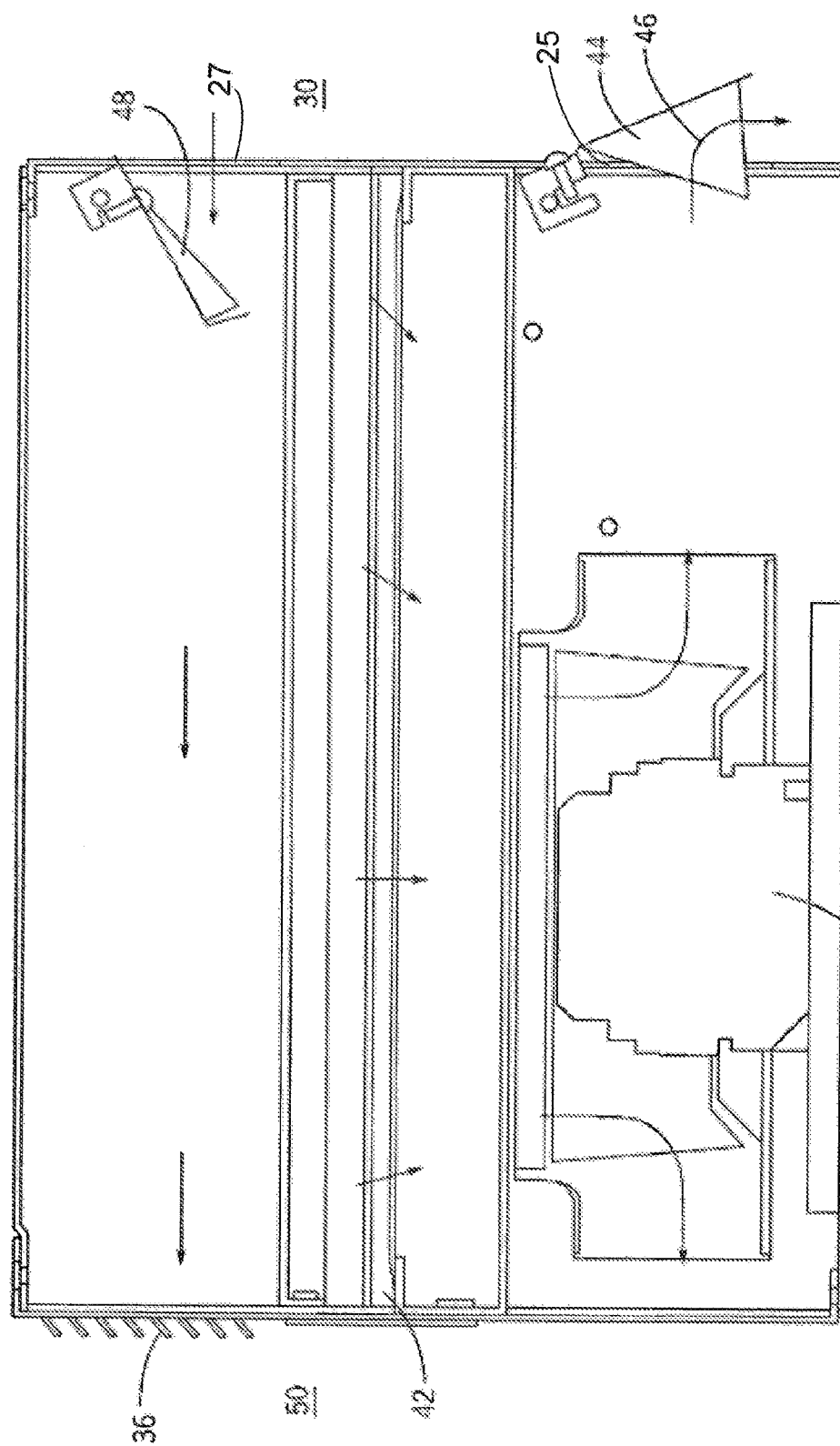
FIG. 4 is a side sectional view of the ventilator of FIG. 1 in an active state.

FIG. 4 illustrates a cross-sectional side view of the ventilator 20 in an active state. As shown in FIG. 4, as the impeller 40 runs and operates, it will draw in outside air through the air intakes 22, 23 (as shown by the airflow arrows in FIG. 2). The outside air will continue to travel across an air filter 42 to remove contaminants and other undesired particulate from the air. In some embodiments, the filter 42 can be positioned in front of the grilles 32, 34 to filter incoming ambient air from dirt and/or debris. In one embodiment, the filter can be a hydrophobic filter to filter incoming ambient air from water as well as dirt and/or debris.

Still referring to FIG. 4, as the impeller 40 continues to run, eventually the outside air bought in will pressurize the interior space of the ventilator 20 such that this positive pressure is sufficient to cause the inlet dampers 44, 46 to open and allow the outside air to enter the enclosure 30 as indicated by the arrows in FIG. 4.

If the impeller 40 continues to run after the inlet dampers 44, 46 have opened, the impeller 40 will cause the pressure within the interior space of the enclosure 30 to become more and more positively pressurized. As the impeller 40 continues to run, it will eventually create a positive pressure within the enclosure 30 sufficient to cause the outlet damper 48 to open. Air will then flow from the enclosure 30 into the interior space of the ventilator 20 as indicated by arrows in FIG. 4. Once the outlet damper 48 has opened, air within the enclosure 30 can move back through the ventilator 20 and exit through the exhaust vent 24 to the outside 50. This method of operation illustrates an example where the inlet 44, 46 and outlet 48 dampers are manual dampers opened by applying positive air pressure into a space in which they are respectively located. However, it is also contemplated that the inlet 44, 46 and outlet 48 dampers can also be motorized dampers which are connected to and controlled by a control or automation system. The dampers 44, 46, 48 can then be opened and closed as needed to maintain a desired outside air or air pressurization condition.

Figure 5:
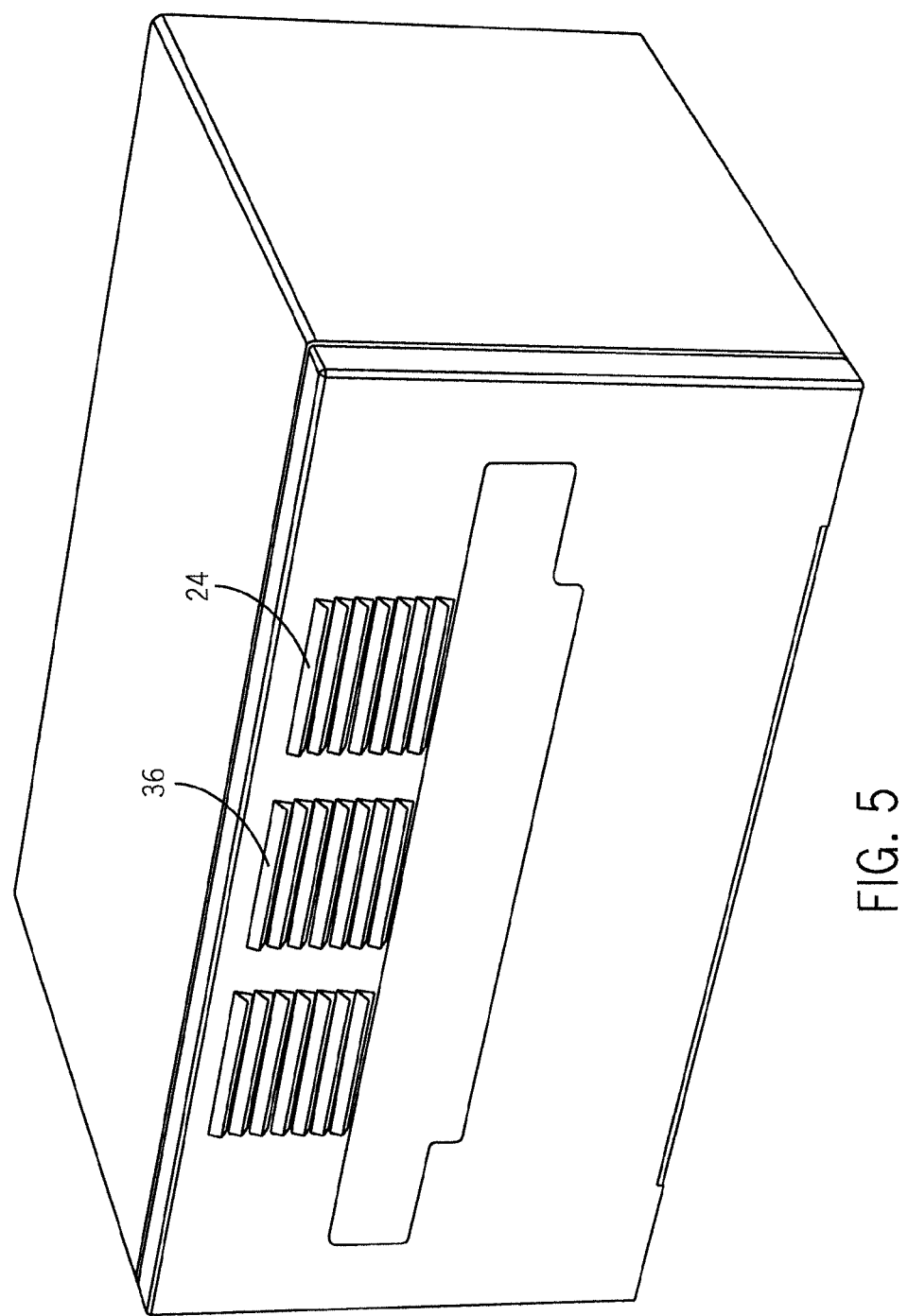
FIG. 5 is a perspective view of an alternative embodiment of a ventilator.

FIGS. 5 and 6 illustrate an alternative embodiment of the ventilator 20. It operates similarly to the first embodiment described above. However, in this embodiment, the ventilator 20 draws in outside air through the bottom of the unit 20 and has a single inlet 44 and outlet 48 damper that interfaces with an enclosure 30.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto.

The invention claimed is:

1. An air conditioning system including an air conditioning unit and a ventilator, the ventilator comprising:
at least one intake vent capable of receiving cool ambient air;
an exhaust vent capable of discharging warm air to the ambient environment;
a supply vent that provides cool air to an enclosure connected to the ventilator;
a return vent that receives warm air from the enclosure;
a filter;
an impeller;
at least one inlet damper;
at least one outlet damper; and
a ventilator control system, wherein the air conditioning unit includes a separate control system configured to interface with and control the ventilator to pull cool ambient air from the at least one intake vent to flow through the filter and to the supply vent and pushes warm air from the enclosure to flow from the return vent to the exhaust vent, the ventilator control system configured to control the ventilator when the separate control system fails.

2. The air conditioning system of claim 1 wherein the at least one inlet damper and at least one outlet damper are motorized and configured to interface with the separate control system and the ventilator control system to change the position of the at least one inlet damper and at least one outlet damper.

3. The air conditioning system of claim 2 wherein the separate control system includes at least one of a temperature sensor, an enthalpy sensor, and a humidity sensor.

4. The air conditioning system of claim 2 wherein the separate control system includes an inside temperature sensor and an outside temperature sensor.

5. The air conditioning system of claim 2 wherein the separate control system includes an inside enthalpy sensor and an outside enthalpy sensor.

6. The air conditioning system of claim 2 wherein the separate control system can include an inside humidity sensor and an outside humidity sensor.

7. The air conditioning system of claim 1 wherein the filter is hydrophobic.

8. The air conditioning system of claim 1 wherein the air conditioning unit and the ventilator are both side-mounted to the enclosure.

9. The air conditioning system of claim 1 wherein the air conditioning unit is operable according to a full economizer, mixed economizer and mechanical cooling mode.

10. A ventilator for an enclosure comprising:
at least one intake vent capable of receiving cool ambient air;
an exhaust vent capable of discharging warm air to the ambient environment;
a supply vent that provides cool air to an enclosure connected to the ventilator;
a return vent that receives warm air from the enclosure;
a filter;
an impeller;
at least one inlet damper; and
at least one outlet damper;
wherein the ventilator includes an integral control system configured to operate independently from an air conditioning unit control system, wherein the integral control system is further configured to pull cool ambient air from the at least one intake vent to flow through the filter and to the supply vent and pushes warm air from the enclosure to flow from the return vent to the exhaust vent.

11. The ventilator of claim 10 wherein the impeller is configured to pull cool ambient air into an interior space of the ventilator until the interior space is sufficiently pressurized to cause the at least one inlet damper to open and allow the cool ambient air to exit through the at least one inlet damper and flow into the enclosure.

12. The ventilator of claim 11 wherein the impeller is further configured to push the cool ambient air into an interior space of the enclosure causing the cool ambient air to mix with air in the interior space of the enclosure to make warm air and wherein the impeller is configured to push cool ambient air into the interior space of the enclosure until the interior space is sufficiently pressurized to cause the at least one outlet damper to open and allow the warm air to flow from the return vent to the exhaust vent.

13. The ventilator of claim 10 wherein the at least one inlet damper and at least one outlet damper are motorized and configured to interface with the integral control system to change the position of the at least one inlet damper and at least one outlet damper.

14. The ventilator of claim 10 wherein the filter is hydrophobic.

15. The ventilator of claim 10 wherein the ventilator is side-mounted to the enclosure.

16. The ventilator of claim 10 wherein the impeller is separate from an air conditioning unit impeller so that the ventilator is operable independently from the air conditioning unit.

* * * * *